US011859794B1

(12) United States Patent
Lin

(10) Patent No.: US 11,859,794 B1
(45) Date of Patent: Jan. 2, 2024

(54) ROTARY PROJECTION NIGHT LAMP

(71) Applicant: Yuxi Lin, Shantou (CN)

(72) Inventor: Yuxi Lin, Shantou (CN)

( * ) Notice: Subject to any disclaimer, the term of this patent is extended or adjusted under 35 U.S.C. 154(b) by 0 days.

(21) Appl. No.: 18/464,651

(22) Filed: Sep. 11, 2023

(51) Int. Cl.
*F21V 1/10* (2006.01)
*F21V 23/00* (2015.01)

(52) U.S. Cl.
CPC .............. *F21V 1/10* (2013.01); *F21V 23/003* (2013.01)

(58) Field of Classification Search
CPC ................................ F21V 1/10; F21V 23/003
See application file for complete search history.

(56) References Cited

U.S. PATENT DOCUMENTS

| | | | | |
|---|---|---|---|---|
| 3,393,310 | A * | 7/1968 | Ream | F21S 8/035 362/276 |
| 3,686,494 | A * | 8/1972 | Naylor | F21V 1/10 362/811 |
| 5,491,616 | A * | 2/1996 | Reed | F21V 17/168 362/354 |
| 6,135,603 | A * | 10/2000 | Chen | F21V 1/10 40/430 |
| 6,592,423 | B1 * | 7/2003 | Boyle | A63H 33/22 446/175 |
| 6,631,999 | B1 * | 10/2003 | Chang | F21V 17/14 362/101 |
| 7,473,002 | B1 * | 1/2009 | Chen | G09F 23/00 40/433 |
| 9,587,806 | B2 * | 3/2017 | Liu | F21V 21/08 |
| 11,435,060 | B1 * | 9/2022 | Zhang | F21V 1/26 |
| 2002/0105808 | A1 * | 8/2002 | Ting Yup | G09F 19/12 40/503 |
| 2002/0181234 | A1 * | 12/2002 | Kawahara | G02B 3/00 362/257 |
| 2015/0366020 | A1 * | 12/2015 | Park | F21V 33/0056 362/249.02 |
| 2023/0066487 | A1 * | 3/2023 | Yang | F21S 10/00 |

* cited by examiner

*Primary Examiner* — Bryon T Gyllstrom
(74) *Attorney, Agent, or Firm* — Daniel M. Cohn; Howard M. Cohn

(57) ABSTRACT

A rotary projection night lamp relates to a field of lamps and includes a base, a light-emitting assembly disposed on the base, a rotating assembly disposed in the light-emitting assembly, a lamp panel disposed on the rotating assembly, and a pattern cover covering on the rotating assembly. The pattern cover is driven to rotate by the rotating assembly. A control board is disposed in the base. The control board is electrically connected to the light-emitting assembly and the lamp panel. The light-emitting assembly includes a shell disposed on the base and a light-emitting main body disposed on the shell. The rotating assembly includes a rotating disc. Clamping grooves are defined on an edge of a top face of the rotating disc. Protrusions matched with the clamping grooves are disposed on an edge of a lower end of the pattern cover. The protrusions are respectively clamped with the clamping grooves.

20 Claims, 5 Drawing Sheets

ROTARY PROJECTION NIGHT LAMP

TECHNICAL FIELD

The present disclosure relates to a technical field of lamps, and in particular to a rotary projection night lamp.

BACKGROUND

A projection night lamp generally comprises a pattern cover, and a working principle thereof is that light passes through the pattern cover to project patterns on the pattern cover on a ceiling or a wall to create a unique atmosphere. A conventional pattern cover in a conventional projection night lamp is generally fixed through a plastic ring. When a user wants to change a favorite projection pattern, the user needs to change the conventional pattern cover by himself/herself. However, the conventional pattern cover fixed through the plastic ring is cumbersome to install and remove. In addition, when the user wants to use a lighting function of the conventional projection night lamp independently, it is necessary for the user to remove the pattern cover first, and then install an ordinary lamp cover to realize the lighting function. An operation thereof is cumbersome and affects a user experience.

The above-mentioned defects are necessary to be overcome by those skilled in the art.

SUMMARY

A purpose of the present disclosure is to overcome above-mentioned defects in the prior art. The present disclosure provides a rotary projection night lamp that has multiple functions and is easy to replace a pattern cover thereof.

To achieve the above purpose, the present disclosure provides the rotary projection night lamp. The rotary projection night lamp comprises a base, a light-emitting assembly disposed on the base, a rotating assembly disposed in the light-emitting assembly, a lamp panel disposed on the rotating assembly, and the pattern cover covering on the rotating assembly.

The pattern cover is driven to rotate by the rotating assembly. A control board is disposed in the base. The control board is electrically connected to the light-emitting assembly and the lamp panel.

The light-emitting assembly comprises a shell disposed on the base and a light-emitting main body disposed on the shell. The rotating assembly comprises a rotating disc. Camping grooves are defined on an edge of a top face of the rotating disc. Protrusions matched with the clamping grooves are disposed on an edge of a lower end of the pattern cover. The protrusions are respectively clamped with the clamping grooves.

The rotary projection night lamp has an atmosphere projection function and a lighting function independent from each other. When a user wants to use the lighting function separately, the rotary projection night lamp directly switches from an atmosphere projection mode to a lighting mode, which is simple and convenient to operate and brings a good user experience. Therefore, the present disclosure saves an operation of removing the pattern cover to install an ordinary lamp cover. At the same time, the rotating assembly comprises the rotating disc, the clamping grooves are defined on the edge of the top face of the rotating disc, and the protrusions matched with the clamping grooves are disposed on the edge of the lower end of the pattern cover, so that there is no need to use a plastic ring to fix the pattern cover, which is convenient for the user to replace the pattern cover by himself/herself and has strong practicability.

Furthermore, the light-emitting body comprises a housing, a mounting piece, a light guide column, and a ring-shaped light strip. The housing is detachably docked with the shell. The housing is connected to the shell to define an accommodating cavity. The mounting piece is disposed in an upper end of the housing. A first through hole is defined on a center of the mounting piece. The light guide column is a tube structure. The light guide column is disposed on a bottom portion of the mounting piece. The light guide column is communicated with the first through hole. The ring-shaped light strip is disposed on a bottom portion of the light guide column. The ring-shaped light strip is configured as a light source for the light guide column. The light guide column and the ring-shaped light strip are disposed in the accommodating cavity. The shell, the housing, and the light guide column are light-transmitting components. The ring-shaped light strip is disposed on the bottom portion of the light guide column. The light guide column is the light-transmitting component and can play the lighting function. The shell and the housing are also the light-transmitting components, so that light is transmitted from the shell and the housing to the outside, thereby realizing the lighting function of the rotary projection night lamp.

Optionally, the housing is detachably connected to the rotating assembly. A second through hole is defined on a center of the rotating disc of the rotating assembly. The lamp panel is embedded in the second through hole. A cavity coaxial with the second through hole is defined in a bottom portion of the rotating disc. Gear teeth are disposed on an inner wall of the cavity.

Optionally, the rotating assembly further comprises a fixing piece detachably connected to the housing, a gear disposed on the fixing piece, and a motor. An output end of the motor is connected to the gear. The gear is engaged with the gear teeth of the rotating disc.

Optionally, the fixing piece comprises a base plate and a middle connecting column. The base plate is detachably connected to the housing. The middle connecting column is disposed on a bottom portion of the base plate. The middle connecting column is coaxial with the base plate. The middle connecting column is sleeved with the light guide column.

Optionally, a receiving cavity is defined on a center of the base plate. The lamp panel is disposed in the receiving cavity.

Optionally, a mounting groove is defined in the second through hole. The lamp panel comprises a mounting base and an LED lamp bead plate disposed on a top portion of the mounting base. An annular protrusion is disposed on a side wall of an upper portion of the mounting base. The annular protrusion is engaged with the mounting groove, which facilitates an assembly of the rotary projection night lamp and production and processing of the rotary projection night lamp.

Furthermore, the base comprises a base bottom shell, a base upper shell, a battery cover, the control board, and a function button board. A battery bin is disposed in the base bottom shell. The base upper shell is detachably disposed on the base bottom shell and defines button holes. The battery cover is disposed on a bottom portion of the base bottom shell. The battery cover is matched with the battery bin. The control board is detachably disposed in the base bottom shell. The function button board is detachably connected to the base upper shell. The function button board comprises buttons matched with the button holes. The buttons one-to-one pass through the button holes.

Optionally, a micro control unit (MCU) is disposed on the control board. A button signal input end of the MCU is electrically connected to the buttons disposed on the function button board.

Optionally, the rotary projection night lamp further comprises a BLUETOOTH module, an audio output module, a timing module, and a light adjusting module. The BLUETOOTH module, the audio output module, the timing module, and the light adjusting module are electrically connected to the control board. The BLUETOOTH module, the audio output module, the timing module, and the light adjusting module are electrically connected to the MCU. The audio output module is electrically connected to the BLUETOOTH module. The audio output module comprises a loudspeaker disposed on the base. The timing module is electrically connected to the light-emitting assembly and the lamp panel. The light adjusting module is electrically connected to the light-emitting assembly and the lamp panel. The rotary projection night lamp has a BLUETOOTH function, a music playing function, a light adjusting function, and a timing function, which is rich in functions and meets increasing needs of the user, so that audiences of the rotary projection night lamp are wide.

Optionally, first positioning columns are disposed in the base bottom shell. First positioning connecting columns one-to-one corresponding to the first positioning columns are disposed on a bottom portion of the base upper shell. The first positioning connecting columns are one-to-one connected to the first positioning columns.

Optionally, at least one second positioning column is disposed in the base bottom shell. At least one first positioning hole corresponding to the at least one second positioning column is defined on the control board. At least one fastener passes through the at least one first positioning hole and the at least one second positioning column to fix the control board in the base bottom shell.

Optionally, at least one third positioning column is disposed on a bottom portion of the base upper shell. At least one second positioning hole corresponding to the at least one third positioning column is defined on the function button board. The at least one third positioning column is inserted into the at least one second positioning hole.

Optionally, the base upper shell is detachably connected to the shell. Fourth positioning columns are disposed on a top portion of the base upper shell. Second positioning connecting columns one-to-one corresponding to the fourth positioning columns are disposed on a bottom portion of the shell. The second positioning connecting columns are one-to-one connected to the fourth positioning columns.

Optionally, the mounting base and the annular protrusion are integrally formed.

Optionally, sixth positioning columns are disposed in the housing. Fourth positioning connecting columns one-to-one corresponding to the sixth positioning columns are disposed on the bottom portion of the base plate. The fourth positioning connecting columns are one-to-one connected to the sixth positioning columns.

Optionally, the base plate and the middle connecting column are integrally formed.

Optionally, fifth positioning columns are disposed in the shell. Third positioning connecting columns one-to-one corresponding to the fifth positioning columns are disposed on an edge of a bottom portion of the housing. The third positioning connecting columns are one-to-one connected to the fifth positioning columns.

Optionally, the housing, the mounting piece, the light guide column, and the ring-shaped light strip are integrally formed.

Furthermore, the rotary projection night lamp further comprises a lampshade. The lampshade covers on the pattern cover. A bottom edge of the lampshade is fixed to an outer edge of the rotating disc.

Compared with the prior art, in the rotary projection night lamp of the present disclosure, the light-emitting assembly is disposed on the base, the rotating assembly is disposed in the light-emitting assembly, the lamp panel is disposed on the rotating assembly, the pattern cover covers on the rotating assembly, the pattern cover is driven to rotate by the rotating assembly, the control board is disposed in the base, and the control board is electrically connected to the light-emitting assembly and the lamp panel, so that the rotary projection night lamp has the atmosphere projection function and the lighting function independent from each other. At least one LED lamp bead disposed on the lamp panel are turn on through the buttons, light emitted by the at least one LED lamp bead penetrates through the pattern cover, and patterns on the pattern cover are projected on a ceiling or a wall. At this time, the rotary projection night lamp enters the atmosphere projection mode. The ring-shaped light strip of the light-emitting assembly is lit up by pressing the buttons, and light emitted by the ring-shaped light strip penetrates through the shell and the housing to the outside. At this time, the rotary projection night lamp enters the lighting mode. The user is able to directly switch the atmosphere projection mode of the rotary projection night lamp to the lighting mode through pressing the buttons, which is simple and convenient to operate and brings a good user experience. Therefore, the present disclosure saves the operation of removing the pattern cover to install the ordinary lamp cover.

The rotating assembly comprises the rotating disc, the clamping grooves are defined on the edge of the top face of the rotating disc, and the protrusions matched with the clamping grooves are disposed on the edge of the lower end of the pattern cover, so that the patter cover is not easy to fall off when rotating, and there is no need to use the plastic ring to fix the pattern cover, which is convenient for the user to replace the pattern cover by himself/herself and has strong practicability.

The rotary projection night lamp has the BLUETOOTH function, the music playing function, the light adjusting function, and the timing function, which is rich in functions and meets the increasing needs of the user, so that the audiences of the rotary projection night lamp are wide.

IN THE DRAWINGS

1-base; 11-base bottom shell; 12-base upper shell; 13-battery cover; 14-control board; 15-function button board; 2-light-emitting assembly 21-shell; 22-light-emitting main body; 221-housing; 223-mounting piece; 2231-first through hole; 224-light guide column; 225-ring-shaped light strip; 3-rotating assembly; 31-fixing piece; 311-base plate; 312-middle connecting column; 32- rotating disc; 321-clamping groove; 322-second through hole; 3221-mounting groove; 323-cavity; 33-gear; 34-motor; 4-lamp panel; 41-mounting base; 411-annular protrusion; 42-LED lamp bead board; 5-pattern cover; 51-protrusion; 6-lampshade.

DETAILED DESCRIPTION

In order to make objectives, technical solutions, and advantages of the embodiments of the present disclosure clear, technical solutions in the embodiments of the present disclosure will be described clearly and completely in conjunction with the accompanying drawings in the embodiments of the present disclosure. Obviously, the described embodiments are only a part of the embodiments of the present disclosure, rather than all of the embodiments. Based on the embodiments of the present disclosure, all other embodiments obtained by those of ordinary skill in the art without creative work shall fall within the protection scope of the present disclosure.

Figure 1:
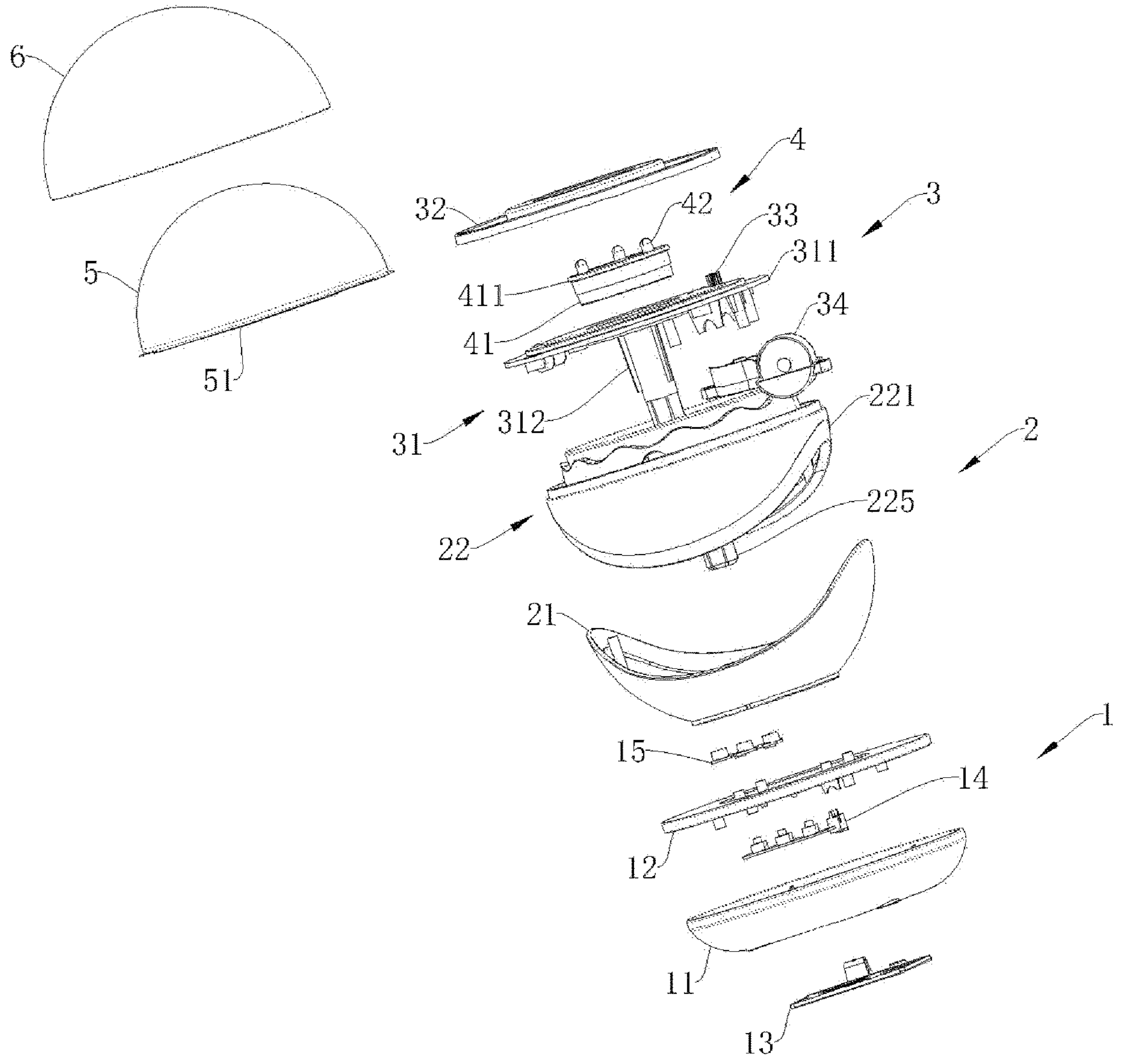
FIG. 1 is an exploded schematic diagram of a rotary projection night lamp according to one embodiment of the present disclosure.

FIG. 1 shows a rotary projection night lamp of the present disclosure according to one embodiment of the present disclosure. The rotary projection night lamp comprises a base 1, a light-emitting assembly 2, a rotating assembly 3, a lamp panel 4, a pattern cover 5, and a lampshade 6. The light-emitting assembly 2 is disposed on the base 1. The rotating assembly 3 is disposed in the light-emitting assembly 2. The lamp panel 4 is disposed on the rotating assembly 3. The pattern cover is covers on the rotating assembly 3. The pattern cover 5 is driven to rotate by the rotating assembly 3. The lampshade 6 covers on the pattern cover 5.

The base 1 comprises a base bottom shell 11, a base upper shell 12, a battery cover 13, a control board 14, and a function button board 15. A battery bin is disposed in the base bottom shell. The battery bin is configured to receive a battery. The battery cover 13 is disposed on a bottom portion of the base bottom shell 11. The battery cover 13 is matched with the battery bin. The base upper shell 12 is detachably disposed on the base bottom shell 11 and defines button holes. The function button board 15 comprises buttons matched with the button holes. The buttons one-to-one pass through the button holes. The function button board 15 is detachably connected to the base upper shell 12. The control board 14 is detachably disposed in the base bottom shell 11.

Specifically, first positioning columns are disposed in the base bottom shell 11. First positioning connecting columns one-to-one corresponding to the first positioning columns are disposed on a bottom portion of the base upper shell 12. The first positioning connecting columns are one-to-one connected to the first positioning columns. Optionally, the first positioning columns and the first positioning connecting columns define first screw holes. First screws respectively pass through the first positioning columns and the first positioning connecting columns to fasten the first positioning columns and the first positioning connecting columns, so as to fix the base bottom shell 11 to the base upper shell 12. At least one second positioning column is disposed in the base bottom shell 11. At least one first positioning hole corresponding to the at least one second positioning column is defined on the control board 14. Optionally, the at least one second positioning column defines a second screw hole. At least one fastener passes through the at least one first positioning hole and the at least one second positioning column to fix the control board 14 in the base bottom shell 11. At least one third positioning column is disposed on a bottom portion of the base upper shell 12. At least one second positioning hole corresponding to the at least one third positioning column is defined on the function button board 15. The at least one third positioning column is inserted into the at least one second positioning hole. Optionally, the at least one third positioning column defines a third screw hole, at least one second screw passes through the third screw hole to fix the function button board 15 to the base upper shell 12.

Figure 2:
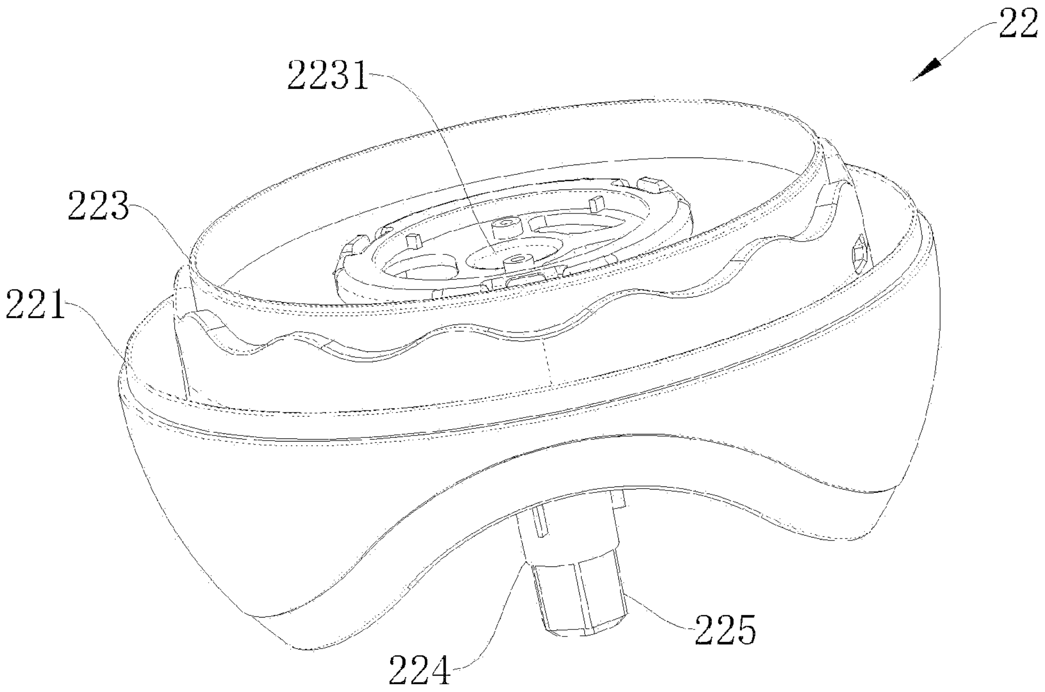
FIG. 2 is a structural schematic diagram of a light-emitting main body of the rotary projection night lamp according to one embodiment of the present disclosure.

As shown in FIG. 2, the light-emitting assembly 2 comprises a shell 21 and a light-emitting main body 22. The shell 21 is disposed on the base 1 and the light-emitting main body 22 is disposed on the shell 21. The base upper shell 12 is detachably connected to the shell 21. Fourth positioning columns are disposed on a top portion of the base upper shell 12. Second positioning connecting columns one-to-one corresponding to the fourth positioning columns are disposed on a bottom portion of the shell 21. The second positioning connecting columns are one-to-one connected to the fourth positioning columns. Optionally, the fourth positioning columns and the second positioning connecting columns define fourth screw holes. Third screws respectively pass through the fourth positioning columns and the second positioning connecting columns to fasten the fourth positioning columns and the second positioning connecting columns, so as to fix the shell 21 to the base upper shell 12.

The light-emitting body 22 comprises a housing 221, a mounting piece 223, a light guide column 224, and a ring-shaped light strip 225. The housing 221 is detachably docked with the shell 21. The housing 221 is connected to the shell 21 to define an accommodating cavity. The mounting piece 223 is disposed in an upper end of the housing 221. A first through hole 2231 is defined on an center of the mounting piece 223. The light guide column 224 is a tube structure. The light guide column 224 is disposed on a bottom portion of the mounting piece 223. The light guide column 224 is communicated with the first through hole 2231. The ring-shaped light strip 225 is disposed on a bottom portion of the light guide column 224. The ring-shaped light strip 225 is configured as a light source for the light guide column 224. The light guide column 224 and the ring-shaped light strip 225 are disposed in the accommodating cavity enclosed by the housing 221 and the shell 21. The light guide column is a light-transmitting component and can play a lighting function. The shell 21 and the housing 221 are also the light-transmitting components, so that light is transmitted from the shell 21 and the housing 221 to outside, thereby realizing alighting function of the rotary projection night lamp.

Fifth positioning columns are disposed in the shell 21. Third positioning connecting columns one-to-one corresponding to the fifth positioning columns are disposed on an edge of a bottom portion of the housing. The third positioning connecting columns are one-to-one connected to the fifth positioning columns. Optionally, the fifth positioning columns and the third positioning connecting columns define fifth screw holes. Fourth screws respectively pass through the fifth positioning columns and the third positioning connecting columns to fasten the fifth positioning columns and the third positioning connecting columns, so as to fix the housing 221 to the shell 21. Optionally, the housing 221, the mounting piece 223, the light guide column 224, and the ring-shaped light strip 225 are integrally formed, which facilitates an assembly of the rotary projection night lamp and production and processing of the rotary projection night lamp.

The rotating assembly 3 comprises a fixing piece 31, a rotating disc 32, a gear 33, and a motor 34. The fixing piece 31 is detachably connected to the housing 221. The gear 33 is disposed on the fixing piece 31. An output end of the motor 34 is connected to the gear 33. The fixing piece 31 comprises a base plate 311 and a middle connecting column 312. The base plate 311 is detachably connected to the housing 221. The middle connecting column 312 is also the light-transmitting component and is disposed on a bottom portion of the base plate 311. The middle connecting column 312 is coaxial with the base plate 311. The middle connecting column 312 is sleeved with the light guide column 224, which facilitates the assembly of the rotary projection night lamp and makes a structure of the rotary projection night lamp stable.

Specifically, sixth positioning columns are disposed in the housing 221. Fourth positioning connecting columns one-to-one corresponding to the sixth positioning columns are disposed on the bottom portion of the base plate 311. The fourth positioning connecting columns are one-to-one connected to the sixth positioning columns. Optionally, the sixth positioning columns and the fourth positioning connecting columns define sixth screw holes. Fifth screws respectively pass through the sixth positioning columns and the fourth positioning connecting columns to fasten the sixth positioning columns and the fourth positioning connecting columns, so as to fix the base plate 311 to the housing 221. Optionally, the base plate 311 and the middle connecting column 312 are integrally formed. Optionally, a receiving cavity is defined on a center of the base plate 331. The lamp panel 4 is disposed in the receiving cavity.

Figure 3:
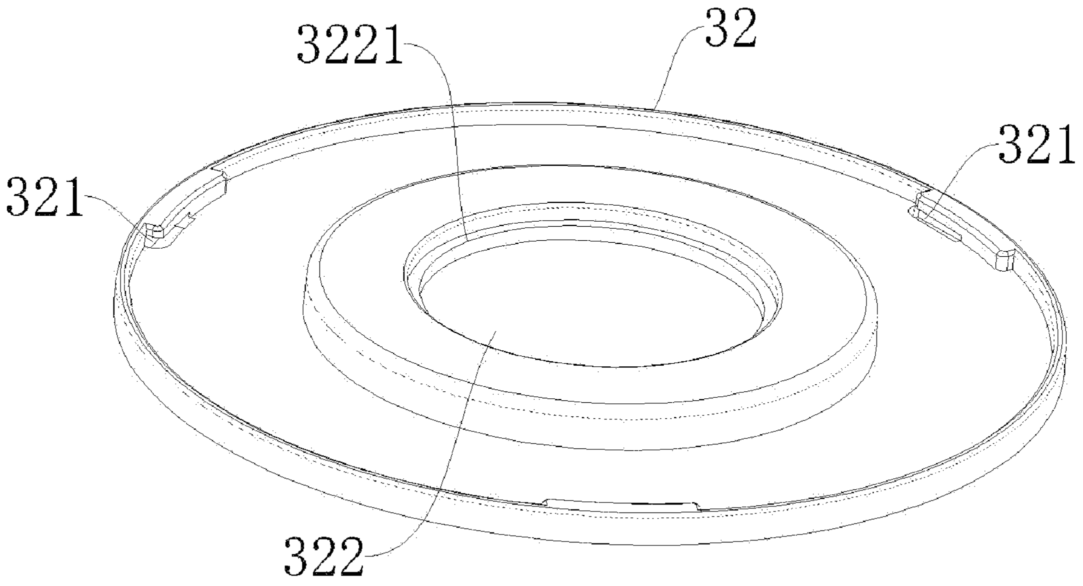
FIG. 3 is a structural schematic diagram of a rotating disc of the rotary projection night lamp according to one embodiment of the present disclosure.
Figure 4:
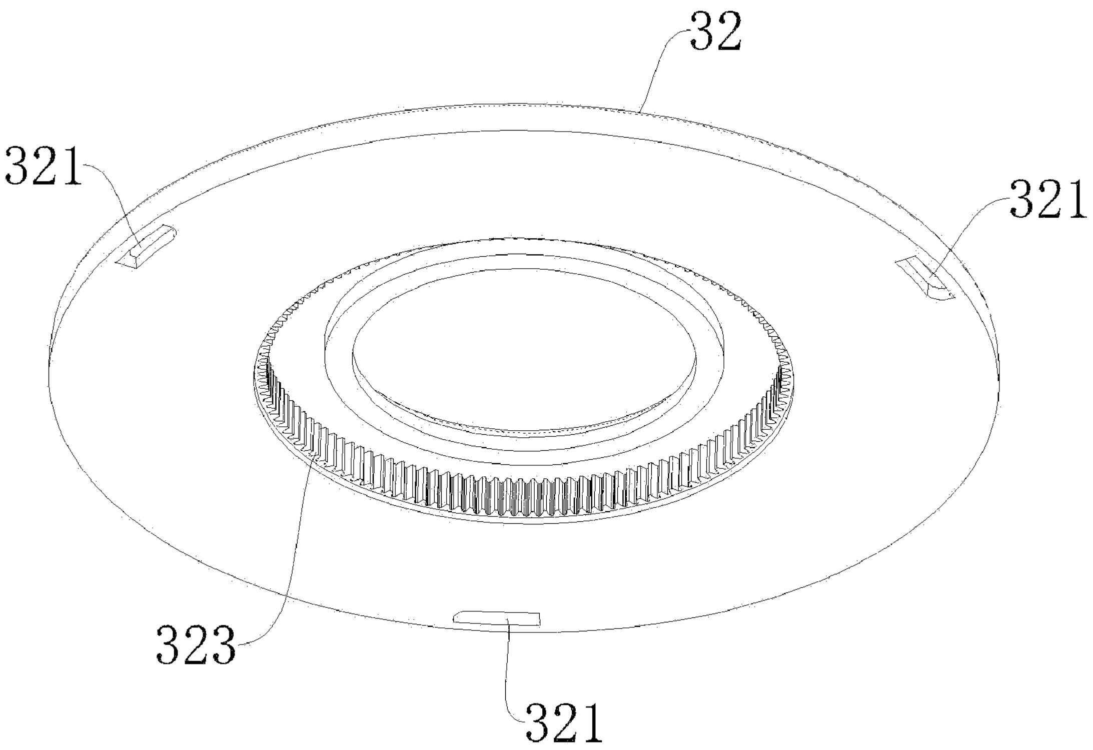
FIG. 4 is another structural schematic diagram of a rotating disc of the rotary projection night lamp according to one embodiment of the present disclosure.

As shown in FIGS. 3 and 4, a second through hole 332 is defined on a center of the rotating disc 32 of the rotating assembly 3. The lamp panel 4 is embedded in the second through hole 332. The lamp panel 4 comprises a mounting base 41 and an LED lamp bead plate 42 disposed on a top portion of the mounting base 41. The LED lamp bead plate 42 comprises at least one lamp bead. The at least one lamp bead is served as the light source. Light emitted by the at least one LED lamp bead penetrates through the pattern cover 5, and patterns on the pattern cover 5 are projected on a ceiling or a wall, so as to realize an atmosphere projection function of the rotary projection night lamp. The lamp panel 4 is disposed in the receiving cavity of the base plate, and the lamp panel 4 is embedded in the second through hole.

An annular protrusion is disposed on a side wall of an upper portion of the mounting base. The annular protrusion is engaged with the mounting groove, which facilitates an assembly of the rotary projection night lamp and production and processing of the rotary projection night lamp.

Optionally, a mounting groove 3221 is defined in the second through hole 322. An annular protrusion 411 is disposed on a side wall of an upper portion of the mounting base 41. The annular protrusion 411 is engaged with the mounting groove 3221. Optionally, the mounting base 41 and the annular protrusion 411 are integrally formed.

A cavity 323 coaxial with the second through hole is defined in a bottom portion of the rotating disc 32. Gear teeth are disposed on an inner wall of the cavity 323. The gear 33 is engaged with the gear teeth of the rotating disc 32. The motor 34 drives the rotating disc 32 to rotate through the gear 33.

Clamping grooves 321 are defined on an edge of a top face of the rotating disc 32. In the embodiment, the pattern cover 5 is a hollow hemispherical structure, and patterns are defined on an outer surface of the pattern cover 5. The patterns are selected from stars, moons, dinosaurs, etc., which increase interest and achieve an effect of creating a romantic atmosphere. Protrusions 51 are disposed on an edge of a lower end of the pattern cover 5. The protrusions 51 are matched with the clamping grooves 321 of the rotating disc 32. The protrusions 51 are respectively clamped with the clamping grooves 321.

In the embodiment, the protrusions 51 are configured as convex strips, and the convex strips are engaged with the clamping grooves 321. In other embodiments, the protrusions 51 are configured as bumps, which are not limited thereto. The rotating disc 32 drives the pattern cover 5 to rotate, and the pattern cover 5 is not easy to fall off when rotating, so that there is no need to use a plastic ring to fix the pattern cover 5, which is convenient for the user to replace the pattern cover 5 having different patterns by himself/herself according to requirements and has strong practicability.

The lampshade 6 is a hollow hemispherical structure. The lampshade 6 covers on the pattern cover 5. A bottom edge of the lampshade 6 is fixed to an outer edge of the rotating disc 32. The lampshade 6 is also the light-transmitting component. Optionally, the lampshade 6 is a transparent plastic component. The lampshade 6 not only protects the pattern cover 5 but also makes the light transmitted softer and less dazzling, bringing the user a good user experience.

Figure 5:
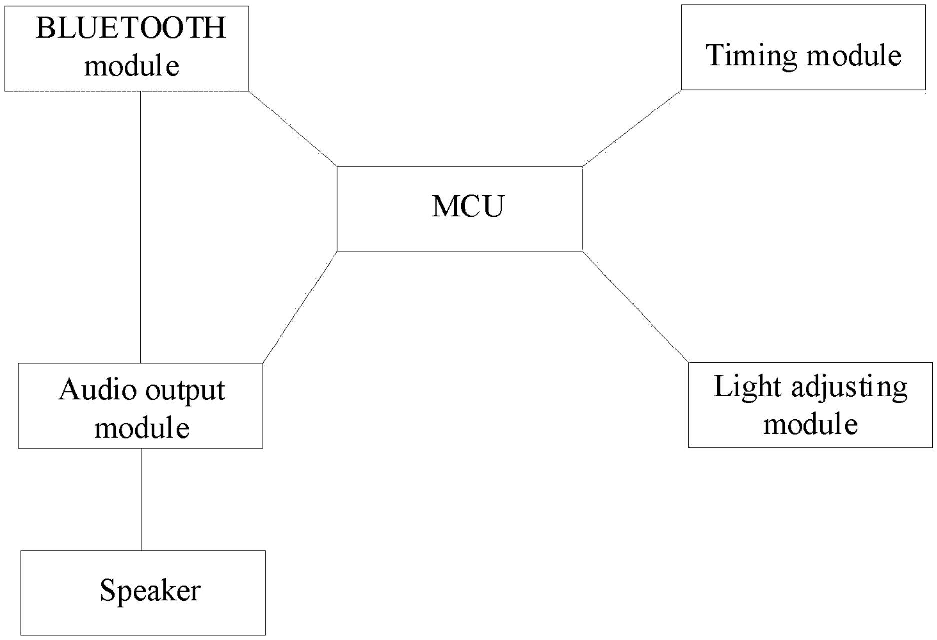
FIG. 5 is a schematic block diagram showing a principle of the rotary projection night lamp according to one embodiment of the present disclosure.

As shown in FIG. 5, the control board 14 in the base 1 is electrically connected to the light-emitting assembly 2 and the lamp panel 4. A micro control unit (MCU) is disposed on the control board 14. A button signal input end of the MCU is electrically connected to the buttons disposed on the function button board 15. The rotary projection night lamp further comprises a BLUETOOTH module, an audio output module, a timing module, and a light adjusting module. The BLUETOOTH module, the audio output module, the timing module, and the light adjusting module are electrically connected to the control board 14. The BLUETOOTH module, the audio output module, the timing module, and the light adjusting module are electrically connected to the MCU.

The audio output module is electrically connected to the BLUETOOTH module. The audio output module comprises a loudspeaker disposed on the base. The rotary projection night lamp is able to be connected to a mobile terminal such as a mobile phone, through the BLUETOOTH module to obtain audio from the mobile terminal. The audio output module is configured to process an external audio transmitted by the BLUETOOTH module and transmit the external audio to the speaker for playback. The timing module is electrically connected to the light-emitting assembly 2 and the lamp panel 4. The rotary projection night lamp controls the light-emitting assembly 2 and the lamp panel 4 to work until the time set by the user and then automatically turn off. The light adjusting module is electrically connected to the light-emitting assembly and the lamp panel. The rotary projection night lamp controls and adjusts a brightness of the ring-shaped lamp strip 225 of the light-emitting assembly 2 and the at least one LED lamp bead of the lamp panel 4.

In the rotary projection night lamp of the present disclosure has the atmosphere projection function and the lighting function independent from each other. The at least one LED lamp bead disposed on the lamp panel 4 are turn on through the buttons, light emitted by the at least one LED lamp bead penetrates through the pattern cover 5, and the patterns on the pattern cover 5 are projected on the ceiling or the wall. At this time, the rotary projection night lamp enters the atmosphere projection mode. The ring-shaped light strip 225 of the light-emitting assembly 2 is lit up by pressing the buttons, and light emitted by the ring-shaped light strip 225 penetrates through the shell 21 and the housing 221 to the outside. At this time, the rotary projection night lamp enters the lighting mode. The user is able to directly switch the atmosphere projection mode of the rotary projection night lamp to the lighting mode through pressing the buttons, which is simple and convenient to operate and brings a good user experience. Therefore, the present disclosure saves the operation of removing the pattern cover to install the ordinary lamp cover. It is convenient for the user to replace the pattern cover by himself/herself and the user is able to freely replace the patter cover 5 to project the patterns he/she likes, which has strong practicability. The rotary projection night lamp has the BLUETOOTH function, the music playing function, the light adjusting function, and the timing function, which is rich in functions and meets the increasing needs of the user, so that the audiences of the rotary projection night lamp are wide.

The above embodiments are optional embodiments of the present disclosure, but the embodiments of the present disclosure are not limited by the foregoing embodiments, and any other changes, modifications, substitutions, combinations, and simplification made without departing from the spirit and principle of the present disclosure should be regarded as equivalent replacement manners, which are all comprised within the protection scope of the present disclosure.

What is claimed is:

1. A rotary projection night lamp, comprising:

a base, a light-emitting assembly disposed on the base, a rotating assembly disposed in the light-emitting assembly, a lamp panel disposed on the rotating assembly, and a pattern cover covering on the rotating assembly;

wherein the pattern cover is driven to rotate by the rotating assembly; a control board is disposed in the base; the control board is electrically connected to the light-emitting assembly and the lamp panel;

wherein the light-emitting assembly comprises a shell disposed on the base and a light-emitting main body disposed on the shell; the rotating assembly comprises a rotating disc; clamping grooves are defined on an edge of a top face of the rotating disc; protrusions matched with the clamping grooves are disposed on an edge of a lower end of the pattern cover; the protrusions are respectively clamped with the clamping grooves.

2. The rotary projection night lamp according to claim 1, wherein the light-emitting body comprises a housing, a mounting piece, a light guide column, and a ring-shaped light strip; the housing is detachably docked with the shell; the housing is connected to the shell to define an accommodating cavity; the mounting piece is disposed in an upper end of the housing; a first through hole is defined on an center of the mounting piece; the light guide column is a tube structure; the light guide column is disposed on a bottom portion of the mounting piece; the light guide column is communicated with the first through hole; the ring-shaped light strip is disposed on a bottom portion of the light guide column; the ring-shaped light strip is configured as a light source for the light guide column; the light guide column and the ring-shaped light strip are disposed in the accommodating cavity; the shell, the housing, and the light guide column are light-transmitting components.

3. The rotary projection night lamp according to claim 2, wherein the housing is detachably connected to the rotating assembly; a second through hole is defined on a center of the rotating disc of the rotating assembly; the lamp panel is embedded in the second through hole; a cavity coaxial with the second through hole is defined in a bottom portion of the rotating disc; gear teeth are disposed on an inner wall of the cavity.

4. The rotary projection night lamp according to claim 3, wherein the rotating assembly further comprises a fixing piece detachably connected to the housing, a gear disposed on the fixing piece, and a motor; an output end of the motor is connected to the gear; the gear is engaged with the gear teeth of the rotating disc.

5. The rotary projection night lamp according to claim 4, wherein the fixing piece comprises a base plate and a middle connecting column; the base plate is detachably connected to the housing; the middle connecting column is disposed on a bottom portion of the base plate; the middle connecting column is coaxial with the base plate; the middle connecting column is sleeved with the light guide column.

6. The rotary projection night lamp according to claim 5, wherein a receiving cavity is defined on a center of the base plate; the lamp panel is disposed in the receiving cavity.

7. The rotary projection night lamp according to claim 5, wherein sixth positioning columns are disposed in the housing; fourth positioning connecting columns one-to-one corresponding to the sixth positioning columns are disposed on the bottom portion of the base plate; the fourth positioning connecting columns are one-to-one connected to the sixth positioning columns.

8. The rotary projection night lamp according to claim 5, wherein the base plate and the middle connecting column are integrally formed.

9. The rotary projection night lamp according to claim 3, wherein a mounting groove is defined in the second through hole; the lamp panel comprises a mounting base and an LED lamp bead plate disposed on a top portion of the mounting base; an annular protrusion is disposed on a side wall of an upper portion of the mounting base; the annular protrusion is engaged with the mounting groove.

10. The rotary projection night lamp according to claim 9, wherein the mounting base and the annular protrusion are integrally formed.

11. The rotary projection night lamp according to claim 2, wherein fifth positioning columns are disposed in the shell; third positioning connecting columns one-to-one corresponding to the fifth positioning columns are disposed on an edge of a bottom portion of the housing; the third positioning connecting columns are one-to-one connected to the fifth positioning columns.

12. The rotary projection night lamp according to claim 2, wherein the housing, the mounting piece, the light guide column, and the ring-shaped light strip are integrally formed.

13. The rotary projection night lamp according to claim 1, wherein the base comprises a base bottom shell, a base upper shell, a battery cover, the control board, and a function button board; a battery bin is disposed in the base bottom shell; the base upper shell is detachably disposed on the base bottom shell and defines button holes; the battery cover is disposed on a bottom portion of the base bottom shell; the battery cover is matched with the battery bin; the control board is detachably disposed in the base bottom shell; the function button board is detachably connected to the base upper shell; the function button board comprises buttons matched with the button holes; the buttons one-to-one pass through the button holes.

14. The rotary projection night lamp according to claim 13, wherein a micro control unit (MCU) is disposed on the control board; a button signal input end of the MCU is electrically connected to the buttons disposed on the function button board.

15. The rotary projection night lamp according to claim 14, wherein rotary projection night lamp further comprises a BLUETOOTH module, an audio output module, a timing module, and a light adjusting module; the BLUETOOTH module, the audio output module, the timing module, and the light adjusting module are electrically connected to the control board; the BLUETOOTH module, the audio output module, the timing module, and the light adjusting module are electrically connected to the MCU; the audio output module is electrically connected to the BLUETOOTH module; the audio output module comprises a loudspeaker disposed on the base; the timing module is electrically connected to the light-emitting assembly and the lamp panel; the light adjusting module is electrically connected to the light-emitting assembly and the lamp panel.

16. The rotary projection night lamp according to claim 13, wherein first positioning columns are disposed in the base bottom shell; and first positioning connecting columns one-to-one corresponding to the first positioning columns are disposed on a bottom portion of the base upper shell; the first positioning connecting columns are one-to-one connected to the first positioning columns.

17. The rotary projection night lamp according to claim 13, wherein at least one second positioning column is disposed in the base bottom shell; at least one first positioning hole corresponding to the at least one second positioning column is defined on the control board; at least one fastener passes through the at least one first positioning hole and the at least one second positioning column to fix the control board in the base bottom shell.

18. The rotary projection night lamp according to claim 13, wherein at least one third positioning column is disposed on a bottom portion of the base upper shell; at least one second positioning hole corresponding to the at least one third positioning column is defined on the function button board; the at least one third positioning column is inserted into the at least one second positioning hole.

19. The rotary projection night lamp according to claim 18, wherein the base upper shell is detachably connected to the shell; fourth positioning columns are disposed on a top portion of the base upper shell; second positioning connecting columns one-to-one corresponding to the fourth positioning columns are disposed on a bottom portion of the shell; the second positioning connecting columns are one-to-one connected to the fourth positioning columns.

20. The rotary projection night lamp according to claim 1, wherein the rotary projection night lamp further comprises a lampshade; the lampshade covers on the pattern cover; a bottom edge of the lampshade is fixed to an outer edge of the rotating disc.

* * * * *